Nov. 18, 1952  R. E. RENARD  2,618,725
CAN KEY WELDING MACHINE
Filed Nov. 20, 1950
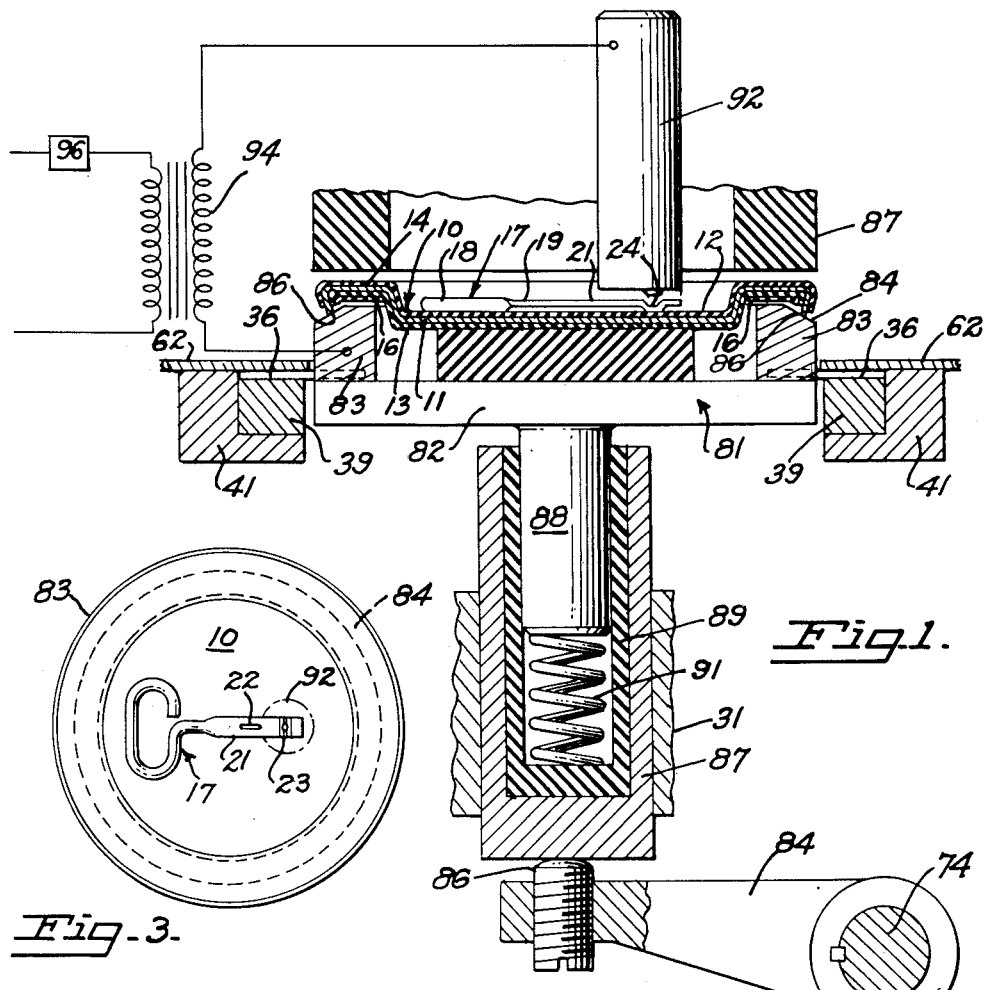
Fig 1.
Fig. 3.
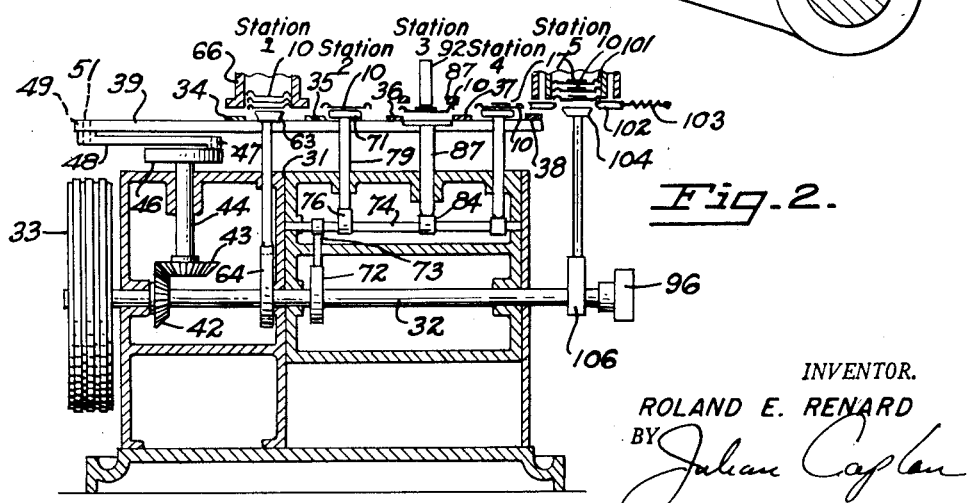
Fig. 2.
INVENTOR.
ROLAND E. RENARD
BY
ATTORNEY Patented Nov. 18, 1952

2,618,725

UNITED STATES PATENT OFFICE 2,618,725

CAN KEY WELDING MACHINE

Roland E. Renard, Los Gatos, Calif., assignor to Pacific Can Company, San Francisco, Calif., a corporation of Nevada Application November 20, 1950, Serial No. 196,571

2 Claims. (Cl. 219—4)

This invention relates to new and useful improvements in means and method for welding can-opening keys to can ends, said ends having been lacquered or otherwise coated with dielectric material on both top and bottom surfaces and having been lined by deposit in the trough of the can end flange of a suitable lining compound. Thus all operations have been performed on the can end prior to welding of the key, and after welding the can ends may be seamed onto the can bodies without intermediate processing.

The presence of dielectric material on the top and bottom surfaces of can ends presents certain problems in welding the keys to the ends in that said material interferes with passage of welding current. In order to accomplish welding it is desirable that one electrode contact the key, another establish metal-to-metal contact with the can end, and that the key come into metal-to-metal contact with the can end. Upon such contacts being established, application of pressure and passage of electric current welds the key to the can. Heretofore various expedients have been employed, said expedients having various disadvantages which are overcome in the present invention.

One of the features and advantages of the present invention is the fact that the lacquer on the underside of the can end is not disturbed during the welding process, and thus the possibility of the can end deteriorating by reason of exposure of the bare metal to the contents of the can is eliminated.

Another advantage of the instant invention is the fact that the end-contacting electrode engages the can end by contacting the raw edge of the can end flange, thus eliminating the necessity of specially baring the metal. According to common practice, the lacquering of the ends is accomplished while the tinplate is still in flat sheets. Thereafter the discs forming the ends are pressed out and hence the edges of the discs are exposed during the pressing or punching operation when the discs are severed. In the present invention, the exposed metal edge is employed to contact said end-contacting electrode.

Still another feature of the invention is the fact that it is not necessary to pierce the key in order to form a sharp edge which will penetrate the lacquer in order to make contact between the key and the can end. Keys employed in accordance with the present invention may be of the type set forth in the co-pending application of William I. Colvin, filed November 20, 1950, Serial Number, 196,621, executed November 9, 1950, and filed simultaneously herewith, but it will be understood that the present machine and method are adapted for use with other types of keys. It should be emphasized, however, that it is not necessary that the keys have sharp, ragged edges which cut through the lacquer of the can end, but on the contrary, in accordance with the present invention, the application of pressure is such that conventional welding protuberances such as those shown in Stollberg Patent No. 1,823,068 may be employed.

Another feature of the present invention is the fact that stacks of completed can ends are placed in a hopper, the ends are fed into the machine one at a time, they are advanced in a substantially straight line from station to station, there being, in order, a feeding station, an idle station, a welding station where the can ends and keys are welded together, a second idle or inspection station, and a stacking station where the completed ends are stacked.

With the above and other objects, features and advantages in view, the invention consists in the matters hereinafter set forth and more particularly pointed out in the appended claims, reference being had therein to the accompanying drawings, in which:

Fig. 1 is a vertical section through the welding station of the machine;

Fig. 2 is a longitudinal vertical section of the machine, said figure being partly schematic;

Fig. 3 is a top plan of a can end and key showing the locations of the welding electrodes.

The can ends 10 employed in carrying out the present invention are of conventional configuration. The metal portion 11 of such an end has been coated with an outer layer 12 of lacquer, enamel or other dielectric material on the exterior to protect the completed can from exposure to the elements or for decorative purposes, and the inner layer 13 of lacquer has also been applied to protect the can end from corrosion from action of the contents of the can. Preferably the end has been completely formed in that the lining trough 14 has been lined with lining compound 16 in prior operations.

The keys 17 employed in accordance with the present invention are formed of round wire with an oblong handle 18, shank 19, and flattened tail portion 21, said tail portion being provided with an elongated slot 22 for reception of the tongue of the tear strip of the can when it is desired to open the same, a reduced portion 23 at which the key will subsequently fracture when the consumer desires to disengage the key from the can end, and one or more welding protuberances 24 on the underside of the flattened tail portion 21, the function of which will hereinafter be set forth.

The machine which is the subject of this invention employs a base or frame 31 in which is mounted a longitudinally disposed main drive shaft 32 driven by pulley 33 from any suitable electric motor, said shaft driving the various parts of the machine. Said machine is divided into a plurality of stations, and the can ends are moved from station to station, longitudinally of the machine. Said stations are, in order: (1) feed station 1 at which the ends are fed into the machine; (2) idle station 2, required for spacing and available for inspection; (3) welding station 3 at which the keys are fed onto the ends and welded; (4) idle station 4 for inspection; and (5) stacking station 5 at which the completed ends are stacked.

Ends 10 are fed from station to station by means of equally-spaced pairs of opposed feed fingers, 34, 35, 36, 37 and 38, the fingers of each pair being on opposite sides of the machine and fixed to one of the two longitudinally reciprocable feed bars 39, one on either side of the machine, held in ways 41 on frame 31. Said bars are driven off main drive shaft 32, there being a bevel gear 42 on said shaft meshing with a miter bevel gear 43 on vertical shaft 44, the upper end of said shaft 44 having a crank cheek 46 carrying crank pin 47 attached to one end of horizontal connecting rod 48, the opposite end of which is connected to cross-tie member 49 by pin 51, said cross-tie member connecting the two feed bars 39 for simultaneous reciprocatory movement.

At feed station 1, the ends 10 are placed in a vertical hopper 61, with the troughs of the ends facing downward. The ends are drawn out of the hopper one by one and deposited on feed table 62 by vertically reciprocating suction cup 63, which is driven by cam 64 carried by main drive shaft 32. Said ends 10 are deposited on feed table 62 when feed bars 39 are in retracted position, and immediately thereafter said feed bars 39 move forwardly, the first set of fingers 34 moving the end forwardly one station to idle station 2.

At first idle station 2, end 10 is deposited on and held by a magnetic chuck 71 and after deposit said end is raised above the level of feed table 62 by said chuck until feed bars 39 have retracted, thus preventing said end from being moved backward by second fingers 35 upon the return stroke of feed bars 39. Thereupon chuck 71 is lowered and the end is returned to the level of feed table 62 and is moved on to the next station by second set of feed fingers 35. Raising and lowering of chuck 71 is in timed relation to movement of other parts of the machine and is accomplished by rotation of main drive shaft 32. Said shaft 32 carries cam 72, said cam being contacted by rocker arm 73 fixed to rocker shaft 74 so that rocker shaft 74 oscillates as shaft 32 revolves. Also fixed to rocker shaft 74 is rocker arm 76, the anterior of which engages the lower end of rod 77, the upper end of which bears chuck 71, and thus said chuck 71 is caused to reciprocate vertically in timed relation to the horizontal reciprocation of feed bars 39.

From station 2 the end 10 is transferred to welding station 3 where the end is received in chuck 81, said chuck comprising a circular, horizontally disposed plate 82 of approximately the same diameter as end 10 carrying on its upper surface an annular electrode 83 having a beveled upper, outer circumferential corner 84. As seen particularly in Fig. 1, the edge 86 of end 10 is bare by reason of the punching of the circular disc from which the end is formed. Bare edge 86 thus comes into contact with beveled corner 84 when plate 82 is raised throughout almost the entire periphery, end 10 being pressed firmly between electrode 83 and ring-shaped, non-conductive back-up plate 87 fixed immediately thereabove so that an electric welding current may flow between electrode 83 and end 10. Since back-up plate 87 is non-conductive, no damage is caused if electrode 83 engages said plate without an end 10 being in position.

Raising of plate 81 is accomplished by rocker arm 84 on rocker shaft 74. The anterior of arm 84 bears an adjustment screw 86 the projection of which may be adjusted to vary the maximum elevation thereof. Screw 86 bears against the lower surface of hollow cylindrical cup member 87, within which is received vertical stub shaft 88 fixed to the bottom of plate 82, with an electrically insulated sleeve 89 interposed between shaft 88 and cup member 87 and a relief spring 91 in the bottom of sleeve 89 and bearing against the lower end of shaft 88. It will thus be seen that there is no contact between shaft 88 and cup member 87. However, oscillation of shaft 74 imparts vertical reciprocal motion to shaft 88, with spring 91 operating to relieve the upward pressure to prevent crushing of an end 10 between members 83 and 87, said spring compressing upon application of greater force than said end would withstand.

The other welding electrode 92 is stationary and positioned above can end 10. Said electrode contacts the tail 21 of can-opening key 17 and as plate 81 rises back-up plate 93 carried by plate 82 immediately below electrode 92 forces end 10 upward against key 17 and electrode 92 so that key 17 is clamped tightly between electrode 92 and end 10. Plate 93 is likewise insulated so as to prevent damage if electrode 92 contacts same while current is flowing and no end 10 is in position. The lower surface of key 17 bears a pair of rounded protuberances 24 which penetrate lacquer 12 on the upper surface of the can end and establish contact with the metal 11 under said lacquer 12 without in any way damaging lacquer 13 on the underside of the can end or distorting the metal. Thereby welding current may pass between electrode 92 and the metal part 11 of the can end, and, since as has been stated contact has also been established between electrode 83 and raw edge 86, an electric circuit is established. The current from transformer 94 to the secondary of which electrodes 83 and 92 are connected and the pressure welds the key to the end. Timer 96 driven off main drive shaft 32 closes the circuit through the primary of transformer 94 at the time when chuck 81 has reached the top of its stroke. Thereafter chuck 81 is lowered and end 10 and key 17 welded thereto are deposited on feed table 62.

From welding station 3 the ends are moved by feed fingers 37 to second idle station 4 which is similar in construction and function to first idle station 2. The operator may inspect the quality of the weld at said station.

From idle station 4, fingers 38 move end 10 to stacking station 5. At said stacking station is a cylindrical stack 101 positioned above the level of feed table 62 and having an internal diameter slightly larger than the diameter of end 10. At the lower end of stack 101 is a pair of detents 102 beveled upwardly and biased inwardly by springs 103. Ends 10 are deposited on chuck 104 which reciprocates by reason of its contact with eccentric 106 on shaft 32. End 10 is lifted upward by said chuck 104 into stack 101 and detents 102, which have spread apart to allow end 10 to enter, retain the end within the stack upon downward movement of chuck 104.

Details of construction on the foregoing struture are set forth in the patent to Krueger et al., 1,891,646, issued December 20, 1932, and in the co-pending application of myself and William B. Peterson, Serial No. 34,505, filed June 22, 1948, for Can Endmaker.

In operation, at station 1 a stack of can ends 10 is placed in hopper 61, said ends having previously been formed from a disc punched from a sheet of tinplate or the like coated on both surfaces with lacquer 12 and 13 or other suitable coating material so that both surfaces of the end are coated with a dielectric material but edge 86 of end 10 is bare where punched from the original sheet. Said ends 10 are placed in hopper 61 with troughs 14 facing downward, it being understood that the troughs have already been lined with sealing compound 16.

Can ends 10 are fed vertically downward from hopper 61 one at a time upon reciprocation of plunger 63. As each end is fed down, it is deposited on feed table 62 and stripped from plunger 63. Thereupon it is moved from feed station 1 to idle station 2 upon reciprocation of feed bars 39 by opposed feed fingers 34 which move the can end longitudinally of feed table 62. At idle station 2 the can end is raised by chuck 71 which lifts the end above the level of feed bar fingers 35 so that as feed bars 39 move backward on their return stroke the second set of feed fingers 35 does not move the can end backward. It will be understood that inspection of the end 10 may be conducted at idle stations 2 and 4.

As end 10 reaches welding station 3, key 17 is fed onto the can end by any convenient means, said key being positioned in the desired location on end 10 and further being deposited with welding protuberances 24 formed in the key facing downward so that they rest upon the top surface of the end. Chuck 81 rises after the can end and key have been deposited, annular electrode 83 centering the end on chuck 81 and lifting the end so that it is clamped between electrode 83 and insulated annular back-up plate 87. Beveled surface 84 of electrode 83 establishes metal-to-metal contact with raw edge 86 of the can end. Simultaneously the top surface of the tail 21 of key 17 is lifted under stationary electrode 92 and said key is forced against the top surface of the can end by being clamped between electrode 92 and backing plate 93, the pressure exerted being sufficient so that the protuberances 24 penetrate the layer of lacquer 12 on the top surface of said can end and metal-to-metal contact is established between key 17 and can end 10 through said protuberances 24. At this time, through operation of timer 96 transformer 94 is energized and welding current passes between electrode 83 and electrode 92, the circuit traveling through metal 11 of the can end since projections 24 are in contact with the top surface of the can end and ring electrode 83 is in contact with the raw edge 86 of the can end. Pressure is continuously exerted until the heat and pressure have welded key 17 to end 10. Said pressure is governed by spring 91 which compresses as cup member 87 is raised in order to limit the maximum pressure. After welding is completed, plate 82 lowers and deposits the welded end 10 on feed table 62 whereupon the third set of feed fingers 36 moves the end to second idle station 4 for inspection of the weld.

From second idle station 4 the can end is moved to stacking station 5, whereupon the ends 10 are lifted inside stacking cylinder 101, and withdrawn from time to time as accumulated.

It will be understood that whereas a preferred embodiment of the invention has been described and illustrated, changes may be made therein without departing from the spirit of the invention and the scope of the appended claims.

What is claimed is:

1. In apparatus for welding a can-opening key having at least one protuberance depending from the bottom surface of the tail portion thereof to a can end coated with dielectric material on its inner and outer surfaces and having a bare peripheral edge, comprising, a chuck for said end having an annular first electrode with a beveled upper, outer circumferential corner dimensioned and arranged to contact said bare edge substantially its entire circumference, an annular insulated first backing plate positioned immediately above said first electrode whereby said end may be clamped between said first electrode and said first backing plate, a second electrode centrally disposed above said key when deposited on said can end, and a second backing plate on said chuck below said second electrode.

2. Apparatus as claimed in claim 1 which further includes means for elevating said chuck comprising a hollow member, an insulated sleeve in said hollow member, a spring in said sleeve, a shaft depending from said chuck and disposed within said sleeve and resting on said spring, and means for raising said hollow member.

ROLAND E. RENARD.

REFERENCES CITED

The following references are of record in the file of this patent:

UNITED STATES PATENTS

| Number | Name | Date |
|---|---|---|
| 1,215,964 | Murray | Feb. 13, 1917 |
| 1,635,536 | Butler | July 12, 1927 |
| 1,699,091 | Butler | Jan. 15, 1929 |
| 1,823,068 | Stollberg | Sept. 15, 1931 |
| 2,010,952 | Heineman | Aug. 13, 1935 |
| 2,495,758 | Parker | Jan. 31, 1950 |
| 2,498,905 | Abbott | Feb. 28, 1950 |